(12) United States Patent
Nusbickel

(10) Patent No.: US 8,015,304 B2
(45) Date of Patent: Sep. 6, 2011

(54) METHOD TO DISTRIBUTE SPEECH RESOURCES IN A MEDIA SERVER

(75) Inventor: Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 11/164,929

(22) Filed: Dec. 12, 2005

(65) Prior Publication Data

US 2007/0136414 A1    Jun. 14, 2007

(51) Int. Cl.
*G06F 15/16* (2006.01)
(52) U.S. Cl. .................. 709/230; 370/466; 370/469
(58) Field of Classification Search .......... 709/203, 709/230, 231, 219; 370/466, 469
See application file for complete search history.

(56) References Cited

U.S. PATENT DOCUMENTS

| 5,668,854 | A | 9/1997 | Minakami et al. |
|---|---|---|---|
| 5,878,117 | A | 3/1999 | Minakami et al. |
| 5,938,732 | A | 8/1999 | Lim et al. |
| 6,173,322 | B1 | 1/2001 | Hu |
| 6,182,139 | B1 * | 1/2001 | Brendel ............ 709/226 |
| 6,236,999 | B1 | 5/2001 | Jacobs et al. |
| 6,327,622 | B1 | 12/2001 | Jindal et al. |
| 6,374,300 | B2 * | 4/2002 | Masters ............ 709/229 |
| 6,427,002 | B2 | 7/2002 | Campbell et al. |
| 6,535,521 | B1 | 3/2003 | Barghouti et al. |
| 6,560,717 | B1 | 5/2003 | Scott et al. |
| 6,571,274 | B1 | 5/2003 | Jacobs et al. |
| 6,577,712 | B2 | 6/2003 | Larsson et al. |
| 6,587,866 | B1 * | 7/2003 | Modi et al. ............ 718/105 |
| 6,697,858 | B1 | 2/2004 | Ezerzer et al. |
| 6,701,438 | B1 * | 3/2004 | Prabandham et al. ...... 726/11 |
| 6,714,642 | B2 | 3/2004 | Dhir et al. |
| 6,782,418 | B1 * | 8/2004 | Cerrone et al. ........... 709/217 |
| 6,785,649 | B1 | 8/2004 | Hoory et al. |
| 6,801,604 | B2 | 10/2004 | Maes et al. |
| 6,813,635 | B1 | 11/2004 | Jorgenson |
| 6,868,144 | B2 | 3/2005 | Skladman et al. |

(Continued)

FOREIGN PATENT DOCUMENTS

CN           1494028         5/2004

(Continued)

OTHER PUBLICATIONS

Shanmugham et al. "A Media Resuorce Control Protocol Developed by Cisco, Nuance, and Speechworks"[Online]. Apr. 5, 2009 [Retrieved on Oct. 27, 2009]. Internet Engineering Task Force. [Retrieved from: http://tools.ietf.org/pdf/draft-shanmugham-mrcp-07.pdf].*

(Continued)

*Primary Examiner* — Saleh Najjar
*Assistant Examiner* — Eric W Shepperd
(74) *Attorney, Agent, or Firm* — Cuenot, Forsythe & Kim, LLC

(57) ABSTRACT

A method and a system for distributing media processing resources. A first request formatted in accordance with a first protocol can be received from a client requesting a media processing resource. The first request can be morphed into a second request that is formatted in accordance with a second protocol. Further, a media processing resource can be selected from a plurality of available media processing resources, and the second request can be forwarded to the selected media processing resource in accordance with the second protocol.

21 Claims, 2 Drawing Sheets

100

U.S. PATENT DOCUMENTS

| | | | |
|---|---|---|---|
| 6,870,914 B1 | 3/2005 | Bossemeyer et al. | |
| 6,934,756 B2* | 8/2005 | Maes | 709/227 |
| 7,016,844 B2* | 3/2006 | Othmer et al. | 704/270.1 |
| 7,062,556 B1 | 6/2006 | Chen | |
| 7,099,939 B2* | 8/2006 | von Klopp et al. | 709/224 |
| 7,113,986 B2 | 9/2006 | Goldszmidt et al. | |
| 7,552,225 B2 | 6/2009 | Creamer et al. | |
| 2002/0049842 A1 | 4/2002 | Huetsch et al. | |
| 2002/0161578 A1* | 10/2002 | Saindon et al. | 704/235 |
| 2003/0014254 A1 | 1/2003 | Zhang et al. | |
| 2003/0131151 A1* | 7/2003 | Roach et al. | 709/328 |
| 2003/0187658 A1* | 10/2003 | Selin et al. | 704/270.1 |
| 2004/0125794 A1 | 7/2004 | Marquette et al. | |
| 2004/0138890 A1* | 7/2004 | Ferrans et al. | 704/270.1 |
| 2004/0158608 A1 | 8/2004 | Friedman | |
| 2004/0162880 A1 | 8/2004 | Arnone et al. | |
| 2005/0021826 A1* | 1/2005 | Kumar | 709/232 |
| 2005/0065790 A1 | 3/2005 | Yacoub | |
| 2005/0086355 A1* | 4/2005 | Deshpande | 709/231 |
| 2005/0102676 A1 | 5/2005 | Forrester | |
| 2006/0026206 A1* | 2/2006 | Loghmani et al. | 707/104.1 |
| 2006/0041431 A1 | 2/2006 | Maes | |
| 2006/0071778 A1* | 4/2006 | Vesikivi et al. | 340/539.1 |
| 2006/0239249 A1 | 10/2006 | Banner et al. | |
| 2006/0239257 A1 | 10/2006 | Banner et al. | |
| 2007/0038697 A1 | 2/2007 | Zimran et al. | |
| 2007/0043868 A1 | 2/2007 | Kumar et al. | |
| 2007/0047719 A1* | 3/2007 | Dhawan et al. | 379/235 |
| 2007/0081520 A1 | 4/2007 | Da Palma et al. | |
| 2007/0121596 A1 | 5/2007 | Kurapati et al. | |
| 2007/0124431 A1 | 5/2007 | Sharma | |
| 2007/0136469 A1 | 6/2007 | Nusbickel | |
| 2008/0312933 A1 | 12/2008 | Creamer et al. | |

FOREIGN PATENT DOCUMENTS

EP         1122937 A2     8/2001

OTHER PUBLICATIONS

Shanmugham et al., "Media Resource Control Protocol Version 2 (MRCPv2)", IETF Standard Working Draft, Internet Engineering Task Force, IETF, Ch, vol. speechsc, No. 9 (Dec. 7, 2005).

* cited by examiner

METHOD TO DISTRIBUTE SPEECH RESOURCES IN A MEDIA SERVER

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to distributed resource management and, more particularly, to management of distributed media resources.

BACKGROUND OF THE INVENTION

Automatic speech recognizers (ASRs) and text to speech (TTS) synthesizers are speech resources commonly implemented in automated interactive systems, for example in automated voice response systems used in telephone call centers. ASRs and TTS synthesizers are resource consumptive, and oftentimes must be implemented across several machines that constitute a speech server solution. In order to reduce hardware costs, the speech resources are typically shared among many clients and allocated only when they are actually needed.

Media processing resource Control Protocol (MRCP) is a protocol that provides a mechanism for a client device requiring media processing resources, for example ASRs and TTS synthesizers, to control such resources on a network. In particular, MRCP defines requests, responses and events needed to control the media processing resources. Unfortunately, the MRCP standard exclusively relies on the client to distribute client requests. Indeed, MRCP lacks methods that can be implemented by a server to distribute the media processing resources across multiple nodes. Thus, even though a server is better suited for distributing media processing resources, distribution of such resources remains under client control.

It therefore would be beneficial to provide a technique which enables an MRCP server to distribute its own media processing resources.

SUMMARY OF THE INVENTION

The present invention relates to a method and a system for distributing media processing resources in which a user session is established between a client and a server via a first protocol. Additionally, the server receives a first request formatted in accordance with Media Resource Control Protocol (MRCP) from the client requesting a media processing resource. The first request can be morphed into a second request that is formatted in accordance with Hypertext Transfer Protocol (HTTP), by replacing MRCP specific code with correlating HTTP specific code. Further, a media processing resource can be selected from a plurality of available media processing resources, and the second request can be forwarded to the selected media processing resource in accordance with HTTP.

Another embodiment of the present invention can include a machine readable storage being programmed to cause a machine to perform the various steps described herein.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments disclosed herein relate to a method and a system which may be used for distributing Media Resource Control Protocol (MRCP) resources among a plurality of server nodes. For example, an MRCP message requesting a media processing resource can be received over a TCP/IP socket by a protocol morpher/client, and morphed into a standard Hypertext Transfer Protocol (HTTP) message. The HTTP message then can be forwarded to one of a plurality of media servlets that is associated with a media processing resource suitable for responding to the request. Notably, the media servlet to which the request is sent can be selected by the MRCP morpher in accordance with the HTTP protocol. Because the message is sent using the HTTP protocol, media processing resources can be distributed across a plurality of nodes using a middleware platform. An example of such a middleware platform is Java 2 Enterprise Edition (J2EE). Moreover, distribution of the media processing resources is controlled by the server, which is better suited for distributing the media processing resources than the client.

Figure 1:
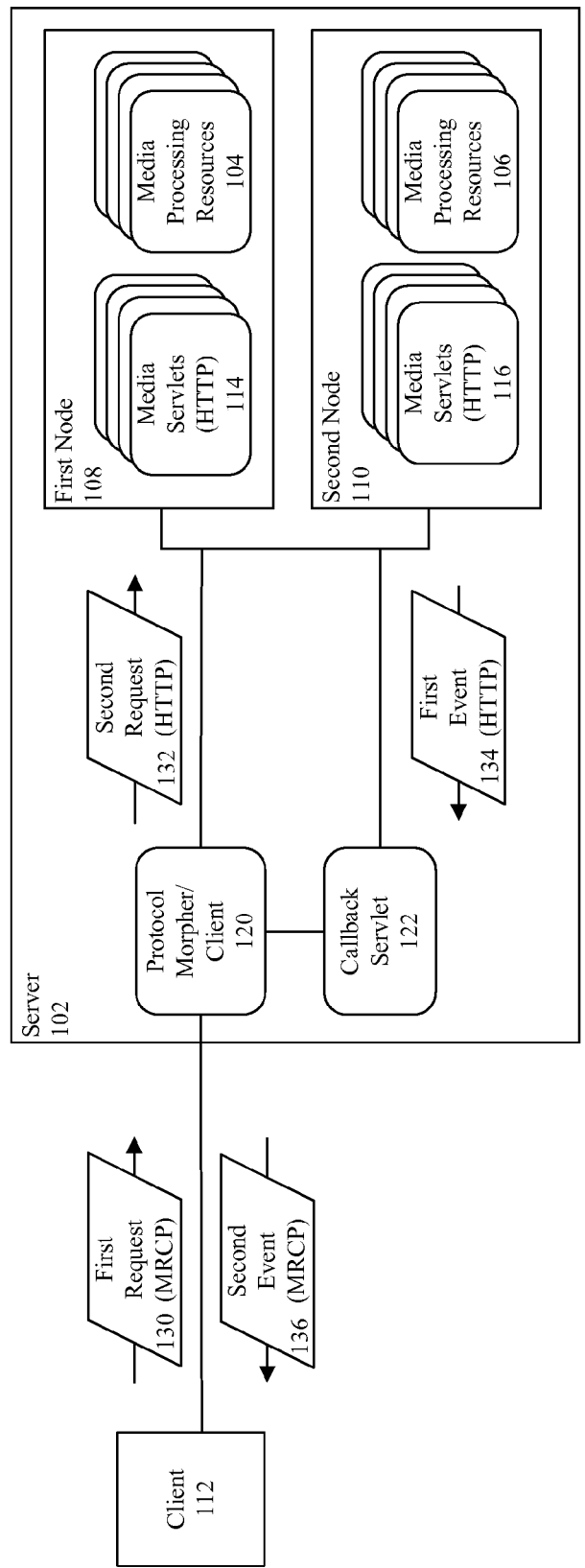
FIG. 1 is a block diagram illustrating a system in which media processing resources are distributed in accordance with one embodiment of the present invention.

FIG. 1 is a block diagram illustrating a system 100 that includes a server 102 in which media processing resources 104, 106 are distributed across a plurality of server nodes in accordance with one embodiment of the present invention. The server 102 can be, for instance, a protocol based server, such as an MRCP server. The server 102 can be realized in hardware, software, or a combination of hardware and software. The server 102 also can be realized in a centralized fashion in one processing system or in a distributed fashion where different elements are spread across several interconnected processing systems.

The server 102 can include one or more processing nodes 108, 110 that provide the media processing resources 104, 106 to one or more clients, for instance a client 112. The media processing resources 104, 106 can be automatic speech recognizers (ASRs), text to speech (TTS) synthesizers, speaker verifiers, dual tone multi-frequency (DTMF) recognizers, or any other resources that can process media requests.

The client 112 can be any device that can connect to the server 102 over a network and to which the server 102 provides media processing resources. For example, the client 112 can be a computer, a telephone, a mobile telephone, a personal digital assistant, a game console, an interactive appliance, or any other device which can access media processing resources provided by the server 102 over a local area network (LAN), a wide area network (WAN), the Internet, or any other communications network. Although one client 112 is shown, the system 100 can include any number of clients accessing the media processing resources 104, 106. Indeed, the methods described herein for distributing media processing resources 104, 106 facilitate simultaneously providing the media processing resources 104, 106 to multiple clients.

The client 112 can communicate with the server 102 by sending to the server a first message, such as a first request 130, in accordance with a suitable communications protocol and receiving a second message, such as a second event 136, in response to the first message. In one arrangement, the messages can be formatted and communicated in accordance with MRCP. To communicate messages in accordance with MRCP version 1, the client 112 can establish a user session with the server 102 using a protocol such as the Real Time Streaming Protocol (RTSP), which operates over TCP/IP. Communicating messages in this manner is generally referred to as "tunneling". To communicate messages in accordance with MRCP version 2, the client 112 can establish a user session using the Session Initiation Protocol (SIP). In contrast to RTSP, after the SIP user session is established, messages are sent directly over TCP/IP instead of being tunneled.

The server 102 can include a protocol morpher/client 120 for receiving a message, such as the first request 130, and morphing the message into a message that is formatted in accordance with a protocol that is different than the protocol with which the first message is formatted. For example, the protocol morpher/client 120 can morph the first request 130 from an MRCP request into an HTTP request. To morph the first request 130, MRCP specific code in the request can be replaced with correlating HTTP specific code. Table 1 below illustrates an example of code that can be contained in the first request 130 prior to being morphed.

TABLE 1

First Request Example

ANNOUNCE rtsp://localhost/media/synthesizer RTSP/1.0
CSeq: 1
Session 1.IBM.9.22.74.38
Date: Tue, 15 FEB 2005 11:28:01 est
Content-Type: application/mrcp
Content-Length: 149
SPEAK 100 MRCP/1.0
voice-name: Andrew
Content-Type: application/synthesis+ssml
Content-Length: 45
<?xml version="1.0"?>
<speak>1 2 3 .</speak>

In order to morph the first request illustrated in Table 1, the protocol morpher/client 120 can change code in the RTSP portion of the message as follows:

replace
    "ANNOUNCE rtsp://localhost/media/synthesizer RTSP/1.0"
with
    "POST /synthesizerServlet HTTP 1.1"
    "Host: myserver.bocaraton.ibm.com"
    "user-agent=Java/1.4.1"
    "accept=text/html, image/gif, image/jpeg, *; q=.2, */*; q=.2"
    "connection=keep-alive".

In this arrangement, the MRCP portion of the message body can remain unchanged. Table 2 below illustrates an example of the second request 132 generated by morphing the first request 130 in this manner.

TABLE 2

Second Request Example #1

POST /synthesizerServlet HTTP 1.1
Host: myserver.bocaraton.ibm.com
user-agent=Java/1.4.1
accept=text/html, image/gif, image/jpeg, *; q=.2, */*; q=.2
connection=keep-alive
CSeq: 1
Session 1.IBM.9.22.74.38
Date: Tue, 15 FEB 2005 11:28:01 est
Content-Type: application/mrcp
Content-Length: 149
SPEAK 100 MRCP/1.0
voice-name: Andrew
Content-Type: application/synthesis+ssml
Content-Length: 45
<?xml version="1.0"?>
<speak>1 2 3 .</speak>

In another arrangement the protocol morpher/client 120 can change code in the RTSP portion of the message as follows:

replace
    "ANNOUNCE rtsp://localhost/media/synthesizer RTSP/1.0"
with
    "POST /synthesizerServlet HTTP 1.1"
    "Host: myserver.bocaraton.ibm.com"
    "user-agent=Java/1.4.1"
    "accept=text/html, image/gif, image/jpeg, *; q=.2, */*; q=.2"
    "connection=keep-alive"
and remove
    "Content-Type: application/mrcp"
    "Content-Length: 149".

In this arrangement code in the MCRP portion of the message can be changed as follows:

replace
    "SPEAK 100 MRCP/1.0"
with
    "MRCPMethod: Speak"

Morphing the code in this manner combines the RTSP and MRCP messages, which changes "SPEAK 100" to an "MRCPMethod: Speak". In addition, the functionality of the content-type and content-length headers that are removed from the RTSP portion of the message can be handled by similar code already contained in the MRCP portion of the message. Table 3 below illustrates an example of the second request 132 generated by morphing the first request 130 in accordance with this example.

TABLE 3

Second Request Example #2

```
POST /synthesizerServlet HTTP 1.1
Host: myserver.bocaraton.ibm.com
user-agent=Java/1.4.1
accept=text/html, image/gif, image/jpeg, *; q=.2, */*; q=.2
connection=keep-alive
CSeq: 1
Session 1.IBM.9.22.74.38
Date: Tue, 15 FEB 2005 11:28:01 est
MRCPMethod: Speak
voice-name: Andrew
Content-Type: application/synthesis+ssml
Content-Length: 45
<?xml version="1.0"?>
<speak>1 2 3 .</speak>
```

By reversing the process described above, the protocol morpher/client 120 also can morph a first event 134 generated in response to the second request 132 into a second event 136 that is formatted in accordance with MRCP. For example, HTTP specific code in the first event 134 can be replaced with correlating MRCP specific code.

The protocol morpher/client 120 also can act as a client to the nodes 108, 110. For example, the protocol morpher/client 120 can act as an HTTP client. In particular, the protocol morpher/client 120 can select a uniform resource identifier (URI) of an appropriate media processing resource, such as the media processing resource 104 or the media processing resource 106. The protocol morpher/client 120 then can call a respective media servlet 114, 116 associated with the selected media processing resource 104, 106 by sending the second request 132 to the media servlet 114, 116. The media servlets 114, 116 can be HTTP servlets that are implemented with a suitable middleware platform that supports instantiating the servlets in a distributed fashion across a plurality of server nodes. One example of such as platform is J2EE, but the invention is not limited in this regard.

For purposes of explanation, throughout the remaining discussion of FIG. 1 it will be assumed that the media servlet 114 is called by the protocol morpher/client 120 although, as noted, the protocol morpher/client 120 can call any media servlets 114, 116 suitable for processing the second request 132. In response to the second request 132, the media servlet 114 can establish a client session, such as an HTTP session, with the protocol morpher/client 120. To achieve affinity with the selected media processing resource 104, the protocol morpher/client 120 can support the client session with cookies and/or uniform resource locator (URL) rewriting.

The media servlet 114 can parse the second request 132 and forward the parsed request 132 to the selected media processing resource 104. Information parsed from the second request 132 can include a URI of a callback servlet 122 to indicate that a first event 134 which is sent in response to the second request 132 is to be forwarded to the callback servlet 122. The parsed information also can include a session identifier to indicate to which client 112 the first event 134 is to be forwarded.

In response to the second request 132, the media processing resource 104 can generate the first event 134 and forward the first event 134 to the callback servlet 122. The first event can include the session identifier. If a failure occurs and the media processing resource 104 does not process the second request 132, the media processing resource 104 can send the first event 134 as a failure response.

The callback servlet 122 can be communicatively linked to the protocol morpher/client 120. The callback servlet 122 can parse the session identifier from first event 134 and forward the first event 134 to the protocol morpher/client 120, indicating the appropriate client 112 to which the response 136 is to be forwarded. For example, the callback servlet 122 can provide the URL of the client 112. The protocol morpher/client 120 then can morph the first event 134 into the second event 136 and forward the second event 136 to the client 112 in accordance with the first protocol. For example, the protocol morpher/client 120 can forward the second event 136 in accordance with MRCP.

Figure 2:
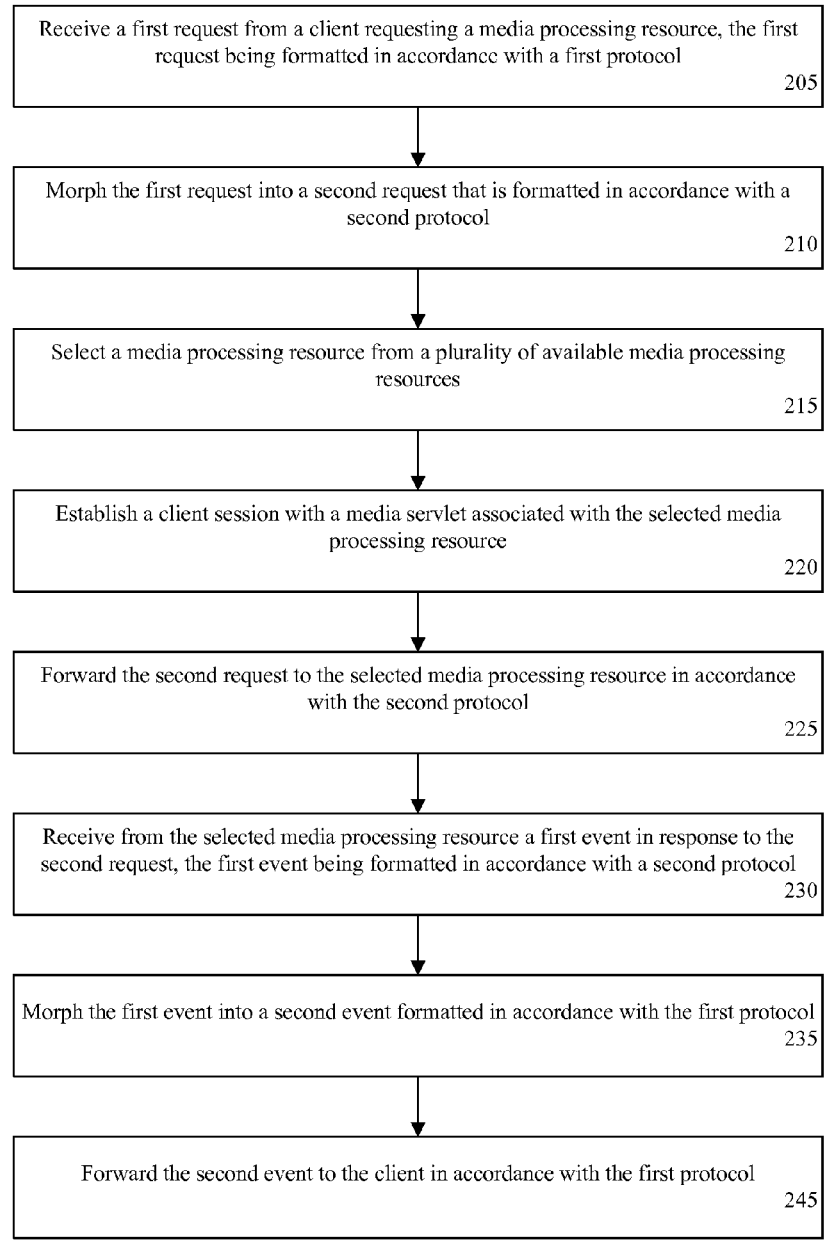
FIG. 2 is a flow chart illustrating a method of distributing media processing resources in accordance with another embodiment of the present invention.

FIG. 2 is a flow chart illustrating a method 200 of distributing media processing resources in accordance with another embodiment of the present invention. Beginning at step 205 a first request can be received from a client requesting a media processing resource. The first request can be formatted in accordance with a first protocol. At step 210, the first request can be morphed into a second request that is formatted in accordance with a second protocol. Proceeding to step 215, a media processing resource can be selected from a plurality of available media processing resources.

At step 220, a client session can be established with a media servlet associated with the selected media processing resource. Continuing to step 225, the second request can be forwarded to the selected media processing resource in accordance with the second protocol. At step 230, a first event generated in response to the second request can be received from the selected media processing resource. The first event can be formatted in accordance with the second protocol. Proceeding to step 235, the first event can be morphed into a second event formatted in accordance with the first protocol. At step 240, the second event can be forwarded to the client in accordance with the first protocol.

present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a general-purpose processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of distributing speech resources comprising:
establishing a user session between a client and a server via a first protocol;
receiving, at the server, a first request from the client requesting a media processing resource, said first request being formatted in accordance with Media Resource Control Protocol (MRCP);
morphing the first request into a second request formatted in accordance with Hypertext Transfer Protocol (HTTP) by:
replacing in a Real Time Streaming Protocol (RTSP) portion of the first request a line of code comprising terms "ANNOUNCE rtsp" with HTTP specific code, and
replacing in an MRCP portion of the first request a line of code comprising the term "SPEAK" with a line of code comprising terms "MRCPMethod: Speak";
wherein the HTTP specific code enables a plurality of media processing resources distributed across a plurality of server nodes to respond to the second request;
selecting at least one of the plurality of media processing resources from the plurality of media processing resources; and
forwarding the second request to the selected at least one media processing resource in accordance with HTTP;
wherein said morphing is performed at a server-side node functioning as an intermediary between the client and the selected at least one media processing resource.

2. The method of claim 1, wherein said step of selecting the at least one of the plurality of media processing resources comprises selecting a media servlet associated with the selected at least one media processing resource.

3. The method of claim 2, further comprising establishing a client session with the media servlet.

4. The method of claim 3, further comprising supporting the client session with cookies or URL rewriting.

5. The method of claim 1, further comprising:
receiving from the selected at least one media processing resource a first event generated in response to the second request, the first event being formatted in accordance with HTTP;
morphing the first event into a second event formatted in accordance with MRCP by replacing HTTP specific code with correlating MRCP specific code; and
forwarding the second event to the client in accordance with MRCP.

6. The method of claim 5, further comprising establishing a client session with a media servlet associated with the selected at least one media processing resource and communicating from the media servlet to a callback servlet a session identifier identifying the client.

7. The method of claim 6, wherein said step of morphing the first event into the second event comprises associating the session identifier with the second event.

8. The method of claim 1, further comprising:
defining the first protocol to be a Real Time Streaming Protocol (RTSP); and
wherein morphing the first request into a second request formatted in accordance with HTTP, further comprises combining code specified in HTTP with code located in the MRCP message.

9. The method of claim 1, further comprising:
removing from the RTSP portion of the first request a line of code comprising the term "Content-Type" and a line of code comprising the term "Content-Length".

10. A machine readable storage device having stored thereon a computer a computer-readable program code configured to perform:
establishing a user session between a client and a server via a first protocol;
receiving, at the server, a first request from the client requesting a media processing resource, the first request being formatted in accordance with Media Resource Control Protocol (MRCP);
morphing the first request into a second request formatted in accordance with Hypertext Transfer Protocol (HTTP) by:
replacing in a Real Time Streaming Protocol (RTSP) portion of the first request a line of code comprising terms "ANNOUNCE rise" with HTTP specific code, and
replacing in an MRCP portion of the first request a line of code comprising the term "SPEAK" with a line of code comprising terms "MRCPMethod: Speak";
wherein the HTTP specific code enables a plurality of media processing resources distributed across a plurality of server nodes to respond to the second request;
selecting at least one of the plurality of media processing resources from the plurality of media processing resources; and
forwarding the second request to the selected at least one media processing resource in accordance with HTTP;
wherein said morphing is performed at a server-side node functioning as an intermediary between the client and the selected at least one media processing resource.

11. The machine readable storage device of claim 10, wherein selecting the at least one of the plurality of media processing resources comprises code for selecting a media servlet associated with the selected at least one media processing resource.

12. The machine readable storage of claim 11, further comprising code for establishing a client session with the media servlet.

13. The machine readable storage of claim 12, further comprising code for supporting the client session with cookies or URL rewriting.

14. The machine readable storage device of claim 10, further comprising computer-readable program code configured to perform:
receiving from the selected at least one media processing resource a first event generated in response to the second request, the first event being formatted in accordance with HTTP;
morphing the first event into a second event formatted in accordance with MRCP by replacing HTTP specific code with correlating MRCP specific code; and
forwarding the second event to the client in accordance with MRCP.

15. The machine readable storage device of claim 14, further comprising computer-readable program code configured to perform:
establishing a client session with a media servlet associated with the selected at least one media processing resource and communicating from the media servlet to a callback servlet a session identifier identifying the client.

16. A system for distributing speech resources comprising:
a protocol morpher configured to:
establish a user session with a client;
receive a first request from the client requesting a media processing resource, the first request being formatted in accordance with Media Resource Control Protocol (MRCP);
morph the first request into a second request formatted in accordance with Hypertext Transfer Protocol (HTTP) by:
replacing in a Real Time Streaming Protocol (RTSP) portion of the first request a line of code comprising terms "ANNOUNCE rtsp" with HTTP specific code, and
replacing in an MRCP portion of the first request a line of code comprising the term "SPEAK" with a line of code comprising terms "MRCPMethod: Speak";
wherein the HTTP specific code enables a plurality of media processing resources distributed across a plurality of server nodes to respond to the second request;
select at least one of the plurality of media processing resources that are available from the plurality of media processing resources; and
forward the second request to the selected at least one media processing resource in accordance with HTTP;
wherein said protocol morpher is located at a server-side node functioning as an intermediary between the client and the selected at least one media processing resource.

17. The system of claim 16, wherein the protocol morpher selects a servlet associated with the selected at least one media processing resource.

18. The system of claim 17, wherein the media servlet establishes a client session with the protocol morpher.

19. The system of claim 18, wherein the protocol morpher supports the client session with cookies or URL rewriting.

20. The system of claim 16, wherein the protocol morpher further receives from the selected at least one media processing resource a first event generated in response to the second request, the first event being formatted in accordance with HTTP, morphs the first event into a second event formatted in accordance with MRCP by replacing
HTTP specific code with correlating MRCP specific code, and forwards the second event to the client in accordance with MRCP.

21. The system of claim 20, further comprising a media servlet associated with the selected at least one media processing resource, the media servlet establishing a client session and communicating to a callback servlet a session identifier identifying the client.

* * * * *